United States Patent
Johnston et al.

(10) Patent No.: US 10,036,517 B2
(45) Date of Patent: Jul. 31, 2018

(54) LIGHTGUIDE AS LUMINAIRE

(71) Applicant: 3M INNOVATIVE PROPERTIES COMPANY, St. Paul, MN (US)

(72) Inventors: Raymond P. Johnston, Lake Elmo, MN (US); Robert L. Brott, Woodbury, MN (US); Patrick R. Fleming, Lake Elmo, MN (US); Karl J. L. Geisler, Saint Paul, MN (US); Kayla A. Hagens, Cottage Grove, MN (US); Steven G. Lucht, Inver Grove Heights, MN (US); Charles N. Devore, Hugo, MN (US); Joseph W. Woody, V, Saint Paul, MN (US); David Scott Thompson, West Lakeland, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 397 days.

(21) Appl. No.: 13/895,463

(22) Filed: May 16, 2013

(65) Prior Publication Data

US 2014/0340927 A1 Nov. 20, 2014

(51) Int. Cl.
*G02B 6/00* (2006.01)
*F21K 99/00* (2016.01)
(Continued)

(52) U.S. Cl.
CPC .................. *F21K 9/52* (2013.01); *F21K 9/61* (2016.08); *G02B 6/0001* (2013.01);
(Continued)

(58) Field of Classification Search
CPC .. G02B 6/0028; G02B 6/0001; G02B 6/0058; G02B 6/0046; G02B 6/0015; G02B 6/0016; G02B 6/0018; F21V 5/02
(Continued)

(56) References Cited

U.S. PATENT DOCUMENTS

| 5,387,458 A | 2/1995 | Pavelka |
| 5,764,845 A | 6/1998 | Nagatani |

(Continued)

FOREIGN PATENT DOCUMENTS

| EP | 953130 | 11/1999 |
| JP | 02215002 | 8/1990 |

(Continued)

OTHER PUBLICATIONS

PCT International Search Report for PCT/US2014/037079, dated Sep. 4, 2014.
Rambus, "Rambus Announces Pentelic™ Lighting Solutions", Rambus Inc., Sunnyvale, CA, Press Release, [Internet Release date May 17, 2011], URL <http://www.rambus.com/us/news/press_release/2011/110517.html>, pp. 2.

(Continued)

*Primary Examiner* — Sean Gramling
*Assistant Examiner* — Gerald J Sufleta, II
(74) *Attorney, Agent, or Firm* — Emily V. Hargett; Lance L. Vietzke

(57) ABSTRACT

A lightguide functioning as a luminaire. The luminaire includes at least one solid state light source, such as an LED, and a lightguide configured to receive light from the solid state light source. Light from the light source is coupled into the lightguide and transported within it by total internal reflection until the light exits the lightguide. A shape of the lightguide causes and directs extraction of the light, and can also be used to create a particular pattern of the extracted light. Such shapes include linear wedges and twisted wedges. Optical films can be included on the light input and output surfaces of the lightguide.

4 Claims, 7 Drawing Sheets

(51) Int. Cl.
| | |
|---|---|
| *F21K 9/61* | (2016.01) |
| *F21V 8/00* | (2006.01) |
| *F21V 29/00* | (2015.01) |
| *F21V 5/00* | (2018.01) |
| *F21V 17/10* | (2006.01) |
| *F21Y 115/10* | (2016.01) |
| *F21Y 113/13* | (2016.01) |

(52) U.S. Cl.
CPC ............ *G02B 6/0046* (2013.01); *F21V 5/005* (2013.01); *F21V 17/104* (2013.01); *F21V 29/004* (2013.01); *F21Y 2113/13* (2016.08); *F21Y 2115/10* (2016.08); *G02B 6/0005* (2013.01); *G02B 6/0025* (2013.01); *G02B 6/0068* (2013.01); *G02B 6/0075* (2013.01); *G02B 6/0091* (2013.01)

(58) Field of Classification Search
USPC .......................................... 362/600–634, 231
See application file for complete search history.

(56) References Cited

U.S. PATENT DOCUMENTS

| | | | | |
|---|---|---|---|---|
| 5,779,337 | A * | 7/1998 | Saito et al. | 362/619 |
| 6,104,738 | A | 8/2000 | Kitoh | |
| 7,052,168 | B2 | 5/2006 | Epstein | |
| 7,452,120 | B2 | 11/2008 | Lee | |
| 7,510,316 | B2 | 3/2009 | De Vaan | |
| 8,154,687 | B2 | 4/2012 | Sung | |
| 8,373,822 | B2 | 2/2013 | Hashimoto | |
| 8,393,773 | B2 | 3/2013 | Lea | |
| 8,469,575 | B2 | 6/2013 | Weber | |
| 8,540,413 | B2 | 9/2013 | Yoon | |
| 8,556,456 | B2 | 10/2013 | Boonekamp | |
| 8,564,848 | B2 | 10/2013 | Shimoyama | |
| 8,953,926 | B1 * | 2/2015 | Kelly et al. | 385/146 |
| 2005/0105302 | A1 | 5/2005 | Hofmann et al. | |
| 2006/0291244 | A1 * | 12/2006 | Yang et al. | 362/609 |
| 2007/0291491 | A1 | 12/2007 | Li | |
| 2008/0079910 | A1 * | 4/2008 | Rutherford | G03B 21/2013 353/84 |
| 2008/0225555 | A1 | 9/2008 | Ochiai | |
| 2008/0285301 | A1 | 11/2008 | Wanninger | |
| 2010/0157615 | A1 | 6/2010 | Gruhlke | |
| 2010/0208490 | A1 | 8/2010 | Tsuchiya | |
| 2011/0141725 | A1 | 6/2011 | Brusilovsky | |
| 2011/0205758 | A1 | 8/2011 | Kim et al. | |
| 2011/0215345 | A1 | 9/2011 | Tarsa | |
| 2011/0227487 | A1 * | 9/2011 | Nichol | G02B 6/0018 315/158 |
| 2011/0291560 | A1 * | 12/2011 | Wang | F21V 29/004 315/32 |
| 2011/0291995 | A1 | 12/2011 | Shr | |
| 2012/0001558 | A1 | 1/2012 | Vos | |
| 2012/0021134 | A1 | 1/2012 | Kolb | |
| 2012/0027945 | A1 | 2/2012 | Kolb | |
| 2012/0169235 | A1 | 7/2012 | Dassanayake et al. | |
| 2012/0236530 | A1 * | 9/2012 | Parker | G02B 6/0058 362/19 |
| 2012/0259393 | A1 | 10/2012 | Benabid | |
| 2012/0293716 | A1 * | 11/2012 | Takata | 348/725 |
| 2013/0155719 | A1 | 6/2013 | Brott | |
| 2013/0250614 | A1 | 9/2013 | Thompson | |

FOREIGN PATENT DOCUMENTS

| | | |
|---|---|---|
| JP | 2003-208810 | 7/2003 |
| JP | 2007-073330 | 3/2007 |
| JP | 2007194132 | 8/2007 |
| JP | 2010-287478 | 12/2010 |
| JP | 2011-028868 | 2/2011 |
| JP | 2011-198659 | 10/2011 |
| WO | WO 1998-033006 | 7/1998 |
| WO | WO 2008/080996 | 7/2008 |
| WO | WO 2009-001272 | 12/2008 |
| WO | WO 2010-122468 | 10/2010 |
| WO | WO 2011-042458 | 4/2011 |
| WO | WO 2011-114265 | 9/2011 |
| WO | WO 2012/075384 | 6/2012 |

OTHER PUBLICATIONS

Rambus, GE Lighting Shows LED Edge Lighting Fixtures Enabled by Rambus Pentelic™ Lighting Solutions at Light Fair 2011, Press Release, provided by Acquire Media, May 18, 2011, pp. 1.
Data Sheet, GE Lumination LED Luminaires, Suspended LED Fixture, EL Series (2012).
Diagram of an LED light fixture on display at the 3M Customer Innovation Center, St. Paul, Minnesota (Jan. 2, 2013).
http://www.rambus.com/us/lighting/index.html http://www.rambus.com/us/lighting/index.html.
U.S. Appl. No. 13/331,119—Office Action dated Apr. 6, 2015.
EP Search Report for EP 14798276.3, dated Dec. 1, 2016 (8 pages).

* cited by examiner

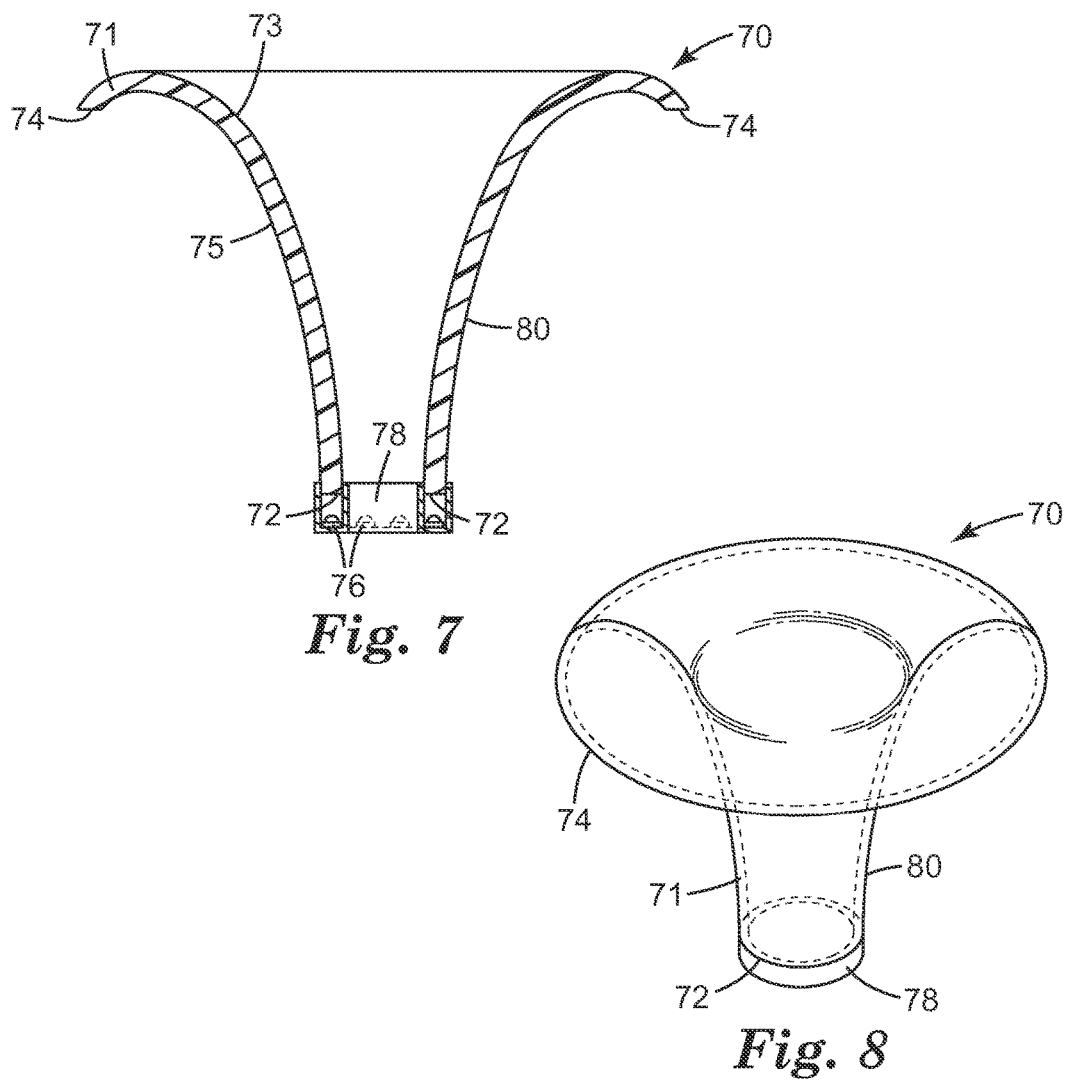
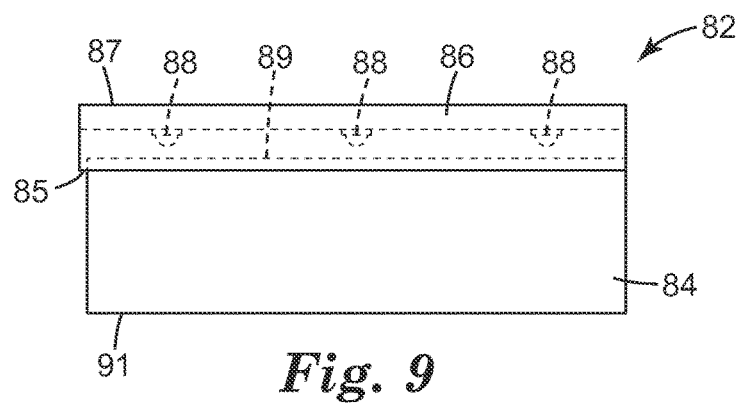

LIGHTGUIDE AS LUMINAIRE

BACKGROUND

Light emitting diodes (LEDs) are essentially point sources of light. Typically, light bulb-shaped lighting applications using LEDs have the LEDs disposed inside of a diffusing dome. The light radiates out from the LEDs through the dome in a fashion similar to an incandescent light bulb. To further control the emission, directionality, and quality of the light, these light bulb-shaped housings are put into fixtures to create luminaires, which are considered complete lighting units. Luminaires using LEDs thus typically require several components, in addition to the LEDs and diffusing dome, to function as a complete lighting unit. Accordingly, a need exists for improved and more versatile luminaires incorporating LEDs or other solid state light sources.

SUMMARY

A luminaire, consistent with the present invention, includes at least one solid state light source and a lightguide configured to receive light from the solid state light source. Light from the light source is coupled into the lightguide and transported within it by total internal reflection until the light exits the lightguide. A shape of the lightguide causes extraction of the light from the lightguide. The shape also directs the extracted light from the lightguide and can cause the light to be extracted in a particular pattern. The luminaire can have various types of optical films on the light input and light output sides of the lightguide.

BRIEF DESCRIPTION OF THE DRAWINGS

The accompanying drawings are incorporated in and constitute a part of this specification and, together with the description, explain the advantages and principles of the invention. In the drawings,
FIG. 7 is a side sectional view of another luminaire;
FIG. 8 is a perspective view of the luminaire of FIG. 7;
FIG. 9 is a front view of a luminaire having a linear wedge lightguide.

DETAILED DESCRIPTION

A shaped luminaire includes at least one light source and a lightguide where light from the light source is coupled into the lightguide and transported by total internal reflection until it exits the lightguide. As a result of the lightguide shape, at particular locations on the lightguide not all light will be reflected due to total internal reflection and will instead exit the lightguide. The shape of the luminaire can include different levels of shape scales to control the light distribution. On a large scale the shape is the form of the lightguide, such as a cone, pyramid, wedge, or other shape. On a smaller scale the lightguide is shaped by having the cross section change. For example, in one aspect the thickness of the lightguide increases in order to collimate and inject the light efficiently into the remainder of the lightguide. In another aspect the thickness of the lightguide decreases in order to extract the light in an efficient manner. In addition to use of shape to extract light, microstructures or nanostructures on a surface of the lightguide can be used in order to further vary the extraction of light from the lightguide.

Examples of shaped lightguide luminaires are described in U.S. patent application Ser. No. 13/331,119, entitled "Lightguide as Luminaire," and filed Dec. 20, 2011, which is incorporated herein by reference as if fully set forth.

Figure 1:
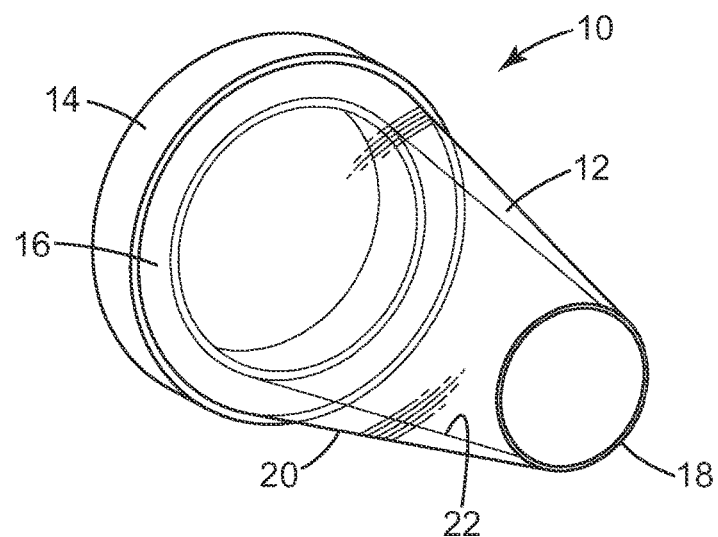
FIG. 1 is a perspective view of a luminaire.
Figure 2:
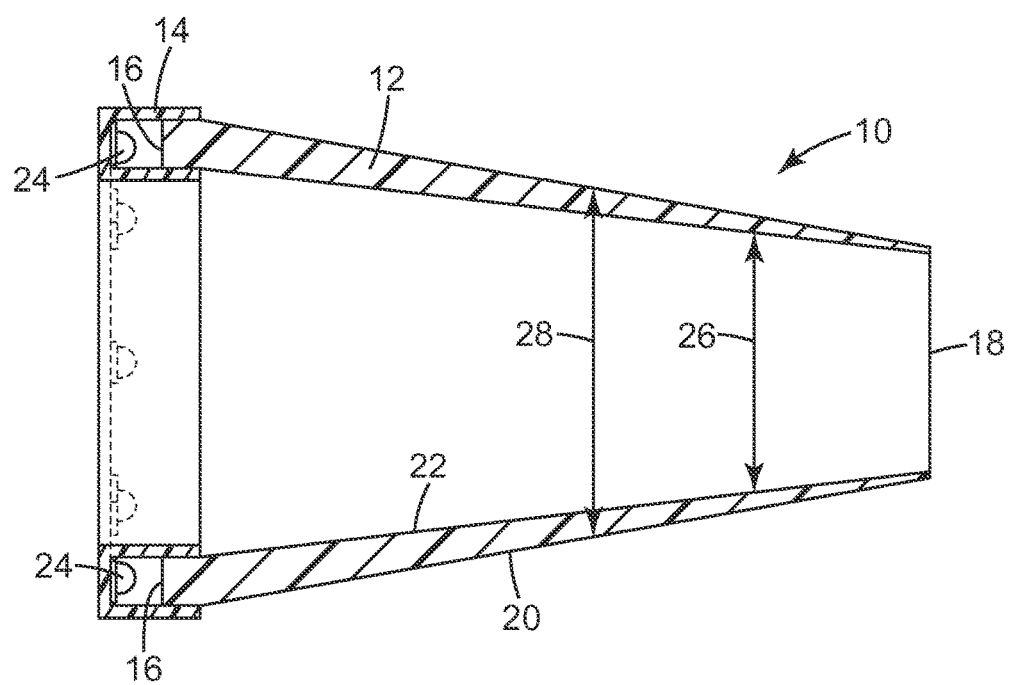
FIG. 2 is a side sectional view of the luminaire of FIG. 1.
Figure 3:
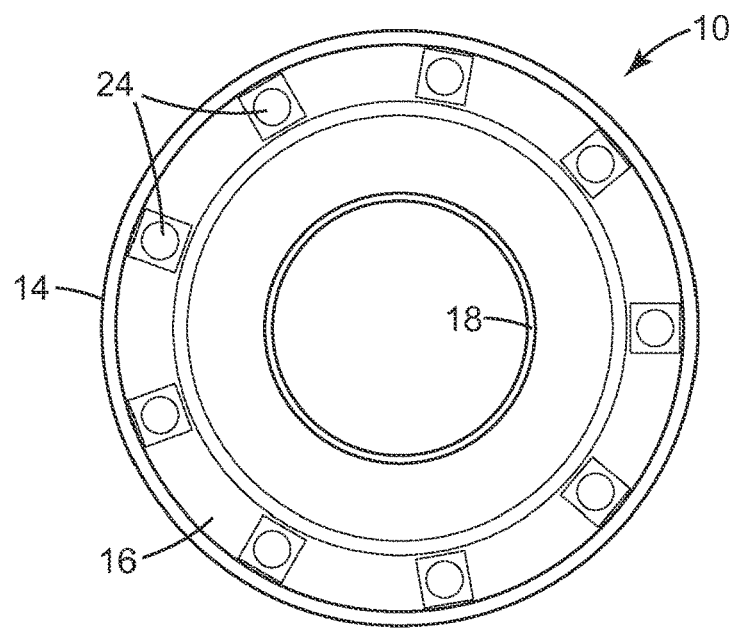
FIG. 3 is an end sectional view of the luminaire of FIG. 1.

FIGS. 1-3 are perspective, side sectional, and end sectional views, respectively, of a luminaire 10. Luminaire 10 includes a lightguide 12 having an outer surface 20, an inner surface 22, a light input end 16, and a distal end 18. Solid state light sources 24, such as LEDs, are contained within a ring 14 and direct light into light input end 16. Ring 14 can be used to create a mixing cavity for light from light sources 24 to be injected into lightguide 12 with high efficiency, for example 80%, 85%, or more preferably 90%. The light injection efficiency can also be within particular ranges, for example 50% to 70%, 60% to 80%, 80% to 85%, 85% to 90%, or 90% to 95%. Ring 14 can be lined on an interior surface with a reflective film or coating to enhance the effects of the mixing cavity. An example of such a reflective film is the Enhanced Specular Reflector (ESR) film product from 3M Company, St. Paul, Minn. Another type of reflective film is non-PEN ESR. As part of the mixing cavity, an air gap can be created between light sources 24 and light input end 16. The edge of lightguide 12 having light input end 16 can be secured in ring 14 through friction or use of fasteners. Further, ring 14 provides a way to efficiently remove heat from light sources 24.

Light sources 24 in ring 14 in this and other embodiments would be connected to a power source and driver for activating and controlling them. An example of a circuit for driving LEDs for a solid state light is disclosed in U.S. Patent Application Publication No. 2012/0001558, which is incorporated herein by reference as if fully set forth. Aside from LEDs, other solid state light sources can be used such as organic light emitting diodes (OLEDs). Also, the light sources and ring can be mounted on a base providing for thermal management and cooling. For example, if the base is implemented with a metal plate the plate can function as a heat sink to conduct and dissipate heat from the light sources. Other thermal management features are possible for cooling the luminaire.

Lightguide 12 in this embodiment has a generally conical shape with an inner radius 26 and an outer radius 28 that both decrease (taper inwardly) from light input end 16 to distal end 18. In this embodiment, lightguide 12 has a continuous cross sectional shape between the light input end and the distal end, meaning the lightguide has no apertures, discrete or continuous extraction elements, or other openings from a cross sectional view as illustrated in FIG. 3.

In operation, the light from light sources 24 is injected or otherwise coupled into lightguide 12 at light input end 16 and transported within the lightguide by total internal reflection until the light exits lightguide 12, possibly along one or both of surfaces 20 and 22, and also possibly at distal end 18. A shape of lightguide 12 causes extraction of the light, and the shape directs the extracted light from lightguide 12. The shape of lightguide 12 can also cause the extracted light to exit lightguide 12 in a particular exiting light pattern. For example, such pattern can be controlled by tapering or bending lightguide 12, or both tapering and bending it, where opposing side surfaces of lightguide 12 are not parallel as shown in FIG. 2. In addition to use of shape, the exiting light pattern can also be partially controlled by features on a surface of lightguide 12. In particular, structures such as facets, lenslets, ribs, and other structures on the lightguide surface can effect light extraction and can also be aesthetic elements of the luminaire design, as well as creating desired exiting light patterns.

Figure 4:
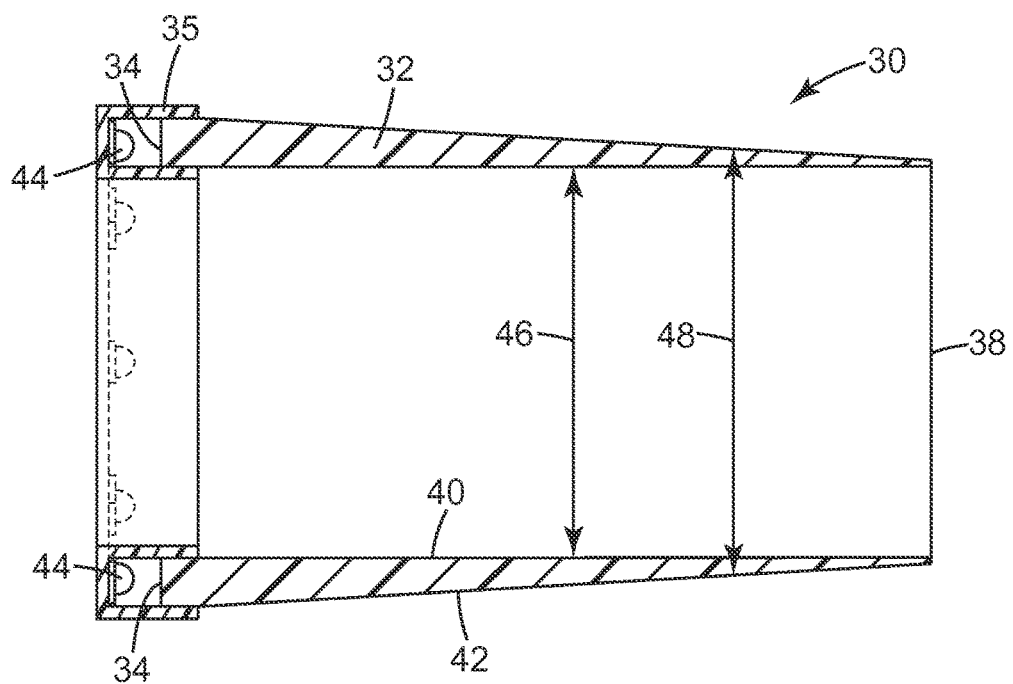
FIG. 4 is a side sectional view of an alternative embodiment of the luminaire of FIG. 1.

FIG. 4 is a side sectional view of an alternative embodiment of the luminaire of FIGS. 1-3. In FIG. 4, a luminaire 30 includes a lightguide 32 having an outer surface 42, an inner surface 40, a light input end 34, and a distal end 38. Solid state light sources 44, such as LEDs, are contained within a ring 35 and direct light into light input end 34. Ring 35 can be used to create a mixing cavity, remove heat, and be secured to lightguide 32 as described with respect to luminaire 10. Lightguide 32 in this embodiment has a generally cylindrical shape with an inner radius 46 that is substantially constant and an outer radius 48 that decreases (tapers inwardly) from light input end 34 to distal end 38. Luminaire 30 functions in a similar manner as luminaire 10 with light transported through lightguide 32 by total internal reflection and with a shape of lightguide 32 causing and directing extraction of light from lightguide 32, possibly in a particular exiting light pattern.

Figure 5:
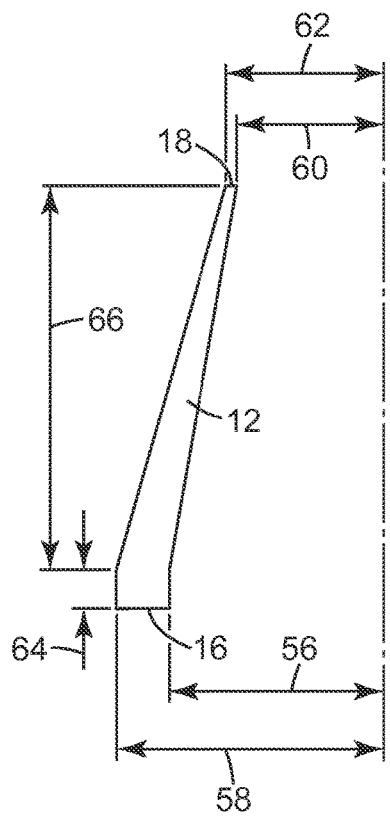
FIG. 5 is a side partial sectional view of the lightguide of FIG. 1 illustrating parameters for use in designing the lightguide.

FIG. 5 is a side partial sectional view of the lightguide of FIG. 1 illustrating parameters for use in designing the lightguide. A design of this lightguide is based upon the following parameters: an inner radius 56 at ring 14 top; an outer radius 58 at ring 14 top; an inner radius 60 at lightguide 12 top; an outer radius 62 at lightguide 12 top; an overall lightguide 12 length 66; and a height 64 of a straight (non-tapered) region at the base of lightguide 12 that fits within ring 14.

These parameters can be varied in order to design a shape of the lightguide to cause extraction of light in a particular exiting light pattern. For example, the taper of the lightguide can be adjusted to make the extracted light more collimated or more dispersed. Also, the taper of the lightguide can vary in one direction, such as from the light input end to the distal end, or the taper can vary in multiple directions. The shape of the distal end can also be configured to further control the light output distribution in combination with the overall shape of the lightguide. For example, rather than being flat, the distal end can have a scalloped, sawtooth, or other non-flat shape.

The shape of the lightguide alone can thus cause the extraction of light from it, possibly in a particular exiting light pattern, as determined by these parameters. Therefore, using the shape of the lightguide to extract light makes the luminaire possible as a stand-alone device. The source of light (the bulb or light source) and the fixture need not necessarily be separate entities in order to create a useful, designed luminaire. Alternatively, the extraction of light can be caused by the shape of the lightguide in conjunction with other features such as microstructures, nanostructure, or coatings on a surface of the lightguide, in which case the light can be extracted from multiple sides of the lightguide. The luminaire can optionally include multiple lightguides each individually functioning as luminaires.

Although a round shape is shown for causing light extraction, the lightguide can include other types of shapes causing and directing the light extraction. For example, the lightguide can have a rectangular cross sectional shape between the light input end and the distal end with the lightguide tapering inwardly (becoming narrow) from the light input end to the distal end. This tapered shape can cause a particular light extraction along the lightguide surfaces between the light input end and the distal end with a remaining portion of light extracted at the distal end. Several of these rectangular lightguides can optionally be mounted adjacent one another to design a chandelier type light fixture with the individual lightguides as the luminaires in the light fixture. Other types of shapes for lightguides as lumaires are also possible as further described below.

Although the round shape is shown having an opening at the distal end, the lightguide need not have an opening at the distal end. For example, the distal end of the lightguide may come to a point (similar to a cone), a curved region (similar to an acorn), a flat region (similar to a truncated spheroid), or any other closed shape.

Figure 6A:
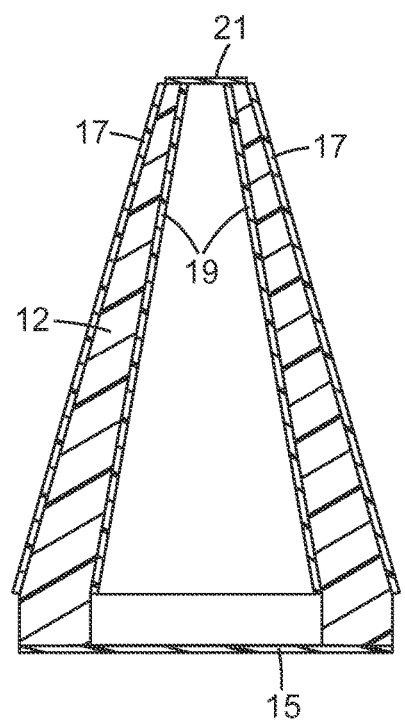
FIG. 6A is a diagram illustrating various optical films on the lightguide of FIG. 1.

FIG. 6A is a diagram illustrating various optical films on the lightguide of FIG. 1. These films can include an optical film 15 adjacent the light input surface of lightguide 12. Examples of optical film 15 include a collimation controlling film such as a brightness enhancement film, and a light spreading film. These films can also include optical films 17, 19, and 21 adjacent the light output surfaces of lightguide 12. Examples of optical films 17, 19, and 21 include light redirecting films, which are structured films designed to redirect light output from the lightguide. The optical films adjacent the input and output surfaces of the lightguide can cover the entire input and output surfaces, or cover only portions of the input and output surfaces.

The optical films adjacent the input and output surfaces of the lightguide can be in physical contact with the lightguide, have an air gap between the films and lightguide, have no air gap between the films and lightguide, or be separated from the lightguide by an intervening layer such as an adhesive. The optical films can be secured with, for example, an adhesive, frame, or other fasteners.

The optical films on the output surfaces of the lightguide can optionally include films to provide for particular decorative or architectural effects. Examples of decorative films include the FASARA Glass Finish products from 3M Company, St. Paul, Minn.

When optical films with microstructured surfaces are included on the output surfaces, those films can be arranged with the microstructures facing toward the lightguide or facing away from the lightguide, and an ultra-low index material can be used in between the microstructured films and the output surfaces of the lightguide, particularly when the microstructured features are facing toward the lightguide. Examples of ultra-low index materials are described in U.S. Patent Applications Publication Nos. 2012/0021134 and 2012/0027945, both of which are incorporated herein by reference as if fully set forth.

The input surface of the lightguide can optionally include a tape that provides for light mixing from the LEDs, an example of which is the 3M Uniformity Tape product from 3M Company, St. Paul, Minn.

Figure 6B:
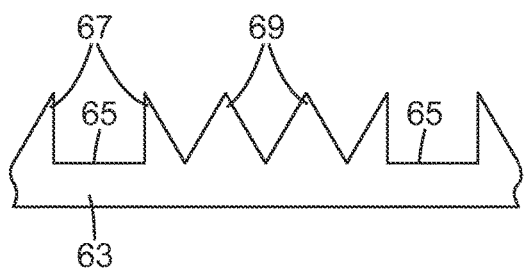
FIG. 6B is a side view illustrating structures on an input surface of a lightguide.
Figure 6C:
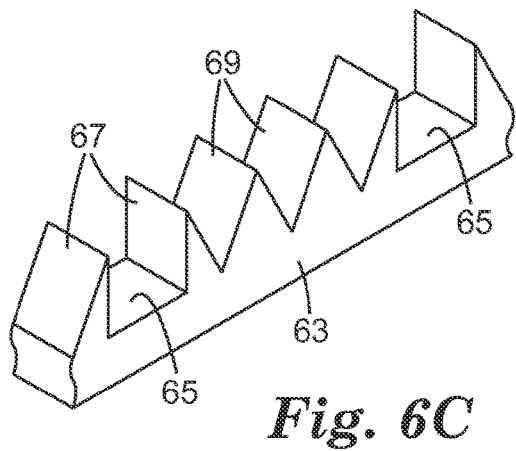
FIG. 6C is a perspective view of the structures shown in FIG. 6B.

The input surface of the lightguide can also optionally include structured features facing toward or away from the lightguide in order to avoid or reduce off-axis glare, for example. These features can be used instead of a collimation controlling film on the input surface. FIGS. 6B and 6C are side and perspective views, respectively, of exemplary structured features 67 and 69 on an input surface of a lightguide 63. Gaps 65 between the structures provide space where the LEDs reside in between feature 67 and 69 and couple light into lightguide 63. In this example, the structured features 67 directly adjacent gaps 65 are 60° or 90° prisms, and the other structured features 69 are 60° prisms. These structured features 67 and 69 would inject light from the LEDs into lightguide 63 at more normal angles than would occur without the structures. A linear lightguide 63 is shown for illustrative purposes only; structured features can also be included on input surfaces of lightguides having other shapes. These structured features can be applied to the lightguide input surfaces after formation of the lightguide, or the structured features can be formed on such surfaces during formation of the lightguide, for example by being molded into the lightguide.

FIGS. 7 and 8 are side sectional and perspective views, respectively, of another luminaire 70. Luminaire 70 includes a lightguide 71 having an outer surface 75, an inner surface 73, a light input end 72, and a distal end 74. Solid state light sources 76, such as LEDs, are contained within a ring 78 and direct light into light input end 72. Ring 78 can be used to create a mixing cavity, remove heat, and be secured to lightguide 71 as described with respect to luminaire 10. In operation, the light from light sources 76 is coupled into lightguide 71 at light input end 72 and transported within lightguide 71 by total internal reflection until the light exits lightguide 71 at distal end 74. A shape of lightguide 71 causes extraction of the light, and the shape directs the extracted light from lightguide 71. In particular, by controlling taper of lightguide 71 as a function of distance through stem portion 80 and controlling the amount of bend in lightguide 71, light can be made to traverse lightguide 71 and exit in a desired pattern, possibly from one or both of surfaces 73 and 75, and also possibly from distal end 74. In contrast to luminaire 10 where the light exits away from the light input end, in luminaire 70 some of the light exits toward the light input end. By varying the shape of the lightguide, light can be made to extract preferentially toward or away from the light input end. Furthermore, by varying the shape of the lightguide, light can be made to extract preferentially in any radial pattern and with any angular distribution.

Figure 10A:
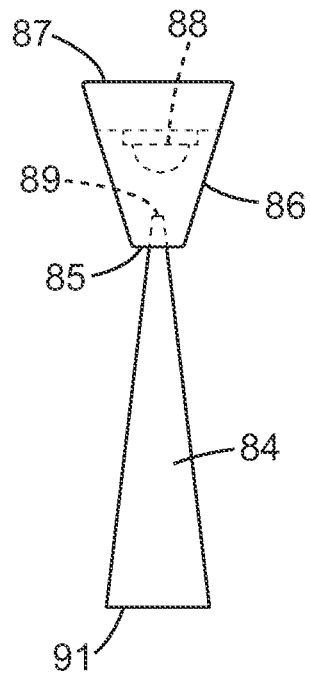
FIG. 10A is a side view of the luminaire of FIG. 9.
Figure 11:
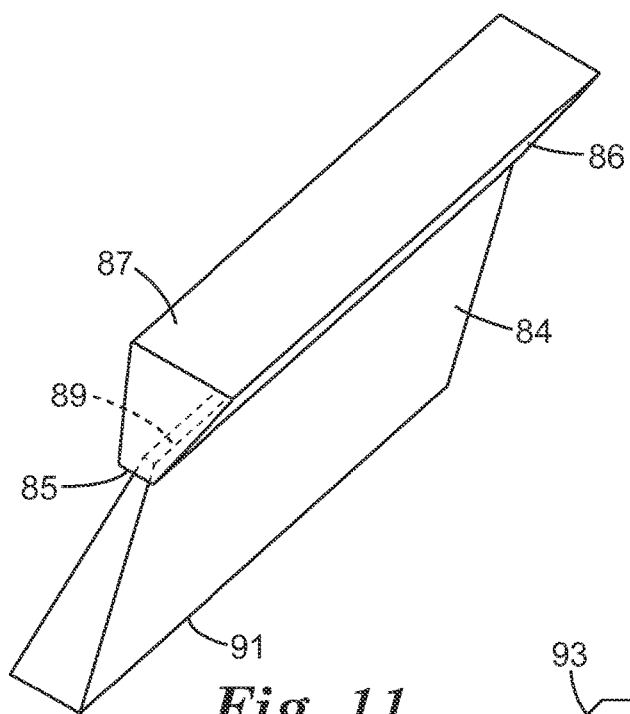
FIG. 11 is a perspective view of the luminaire of FIG. 9.

FIGS. 9, 10A, and 11 are front, side, and perspective views, respectively, of a luminaire 82 having a linear wedge lightguide. Luminaire 82 includes a wedge shaped lightguide 84 supported by a rail 86. Solid state light sources 88, such as LEDs, are contained within rail 86. Lightguide 84 includes a first end 89 and a second end 91 opposite first end 89. Lightguide 84 includes a cross section that varies in area between first and second ends 89 and 91, and the cross section preferably increases in area from first end 89 to second end 91. Also, the lightguide cross section comprises an area of mechanical interference with the rail cross section, providing for the lightguide to be mechanically captured or supported in the rail, examples of which are provided below. For this linear wedge lightguide, first end 89 is substantially parallel with second end 91, or at least sufficiently close to being parallel to be an elongated lightguide. Rail 86 includes a first linear side 85 and a second linear side 87 opposite first side 85. Rail 86 has a cross section that preferably increases in area from first side 85 to second side 87. Lightguide 84 is secured or otherwise supported proximate first side 85. Light from solid state light sources 88 is input to lightguide 84 at first end 89 and output from lightguide 84 at second end 91 and possibly other surfaces. Solid state light sources 88 are located proximate first end 89 or can be contained within depressions in first end 89. Three solid state light sources 88 are shown for illustrative purposes only; more or fewer light sources can be used. Rail 86 would also contain electrical connections for delivering power to solid state light sources 88.

Figure 10B:
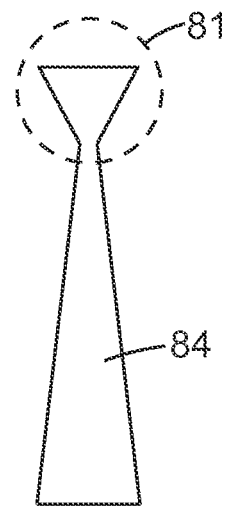
FIG. 10B is a side view of an optional feature for securing the linear wedge lightguide.
Figure 10C:
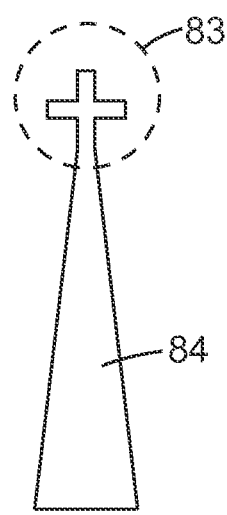
FIG. 10C is a side view of an optional feature for securing the linear wedge lightguide.

FIGS. 10B and 10C are side views of alternate embodiments of lightguide 84 including optional features for securing lightguide 84 to rail 86. FIG. 10B illustrates features 81 in a dovetail configuration, and FIG. 10C illustrates features 83 in a t-shaped configuration. These optional features 81 and 83 can be used to mechanically secure lightguide 84 into rail 86. For example, features 81 and 83 can be used to slide lightguide 84 into rail 86 and then apply an end cap to rail 86. Other types of optional features on lightguide 84 are possible for providing mechanical support to secure lightguide 84 to rail 86. For example, in addition to a cross sectional area of the lightguide being supported in the rail, pins can also be used to secure the lightguide to the rail with the pins extending through apertures in the lightguide.

Figure 12:
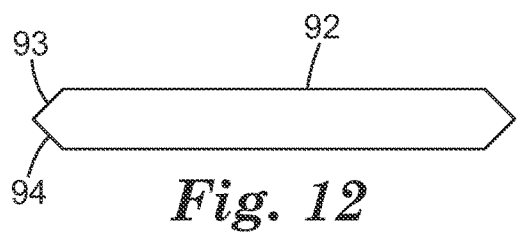
FIG. 12 is a cross sectional view of an alternate embodiment of the lightguide for the luminaire of FIG. 9.

FIG. 12 is a cross sectional view of an alternate embodiment of the lightguide for the luminaire of FIG. 9. This cross sectional view is taken between first and second ends 89 and 91. In this alternative construction, the lightguide has an elongated portion 92 and two angled portions 93 and 94 on the sides between ends 89 and 91. The angled portions 93 and 94 would allow, for example, two of the lightguides to be mated together at right angles to form various configurations of lighting fixtures. By varying the angles of portions 93 and 94, multiple lightguides can also be mated together at other angles for lighting fixtures.

Figure 13:
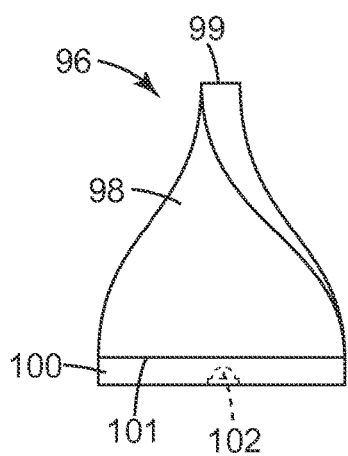
FIG. 13 is a first side view of a luminaire having a twisted wedge lightguide.
Figure 14:
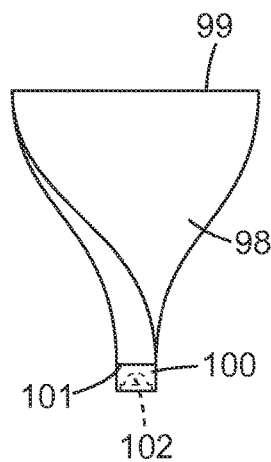
FIG. 14 is a second side view of the luminaire of FIG. 13.
Figure 15:
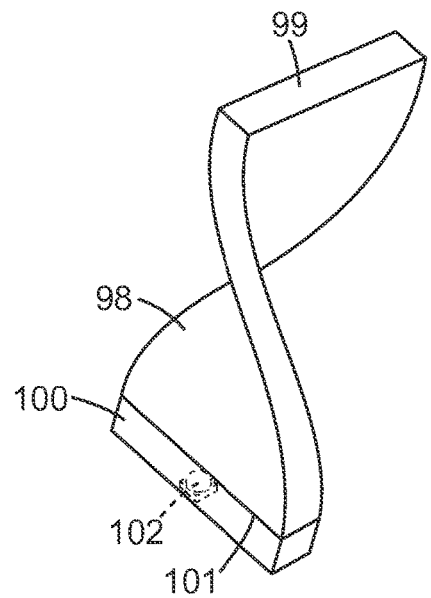
FIG. 15 is a perspective view of the luminaire of FIG. 13.

FIGS. 13-15 are first side, second side, and perspective views, respectively, of a luminaire 96 having a twisted wedge lightguide. Luminaire 96 includes a twisted wedge shaped lightguide 98 and an associated base 100. A solid state light source 102, such as an LED, is contained within base 100. Lightguide 98 includes a first end 101 and a second end 99 opposite first end 101. Lightguide 98 includes a cross section that varies in area between first and second ends 101 and 99, and the cross section preferably decreases in area from first end 101 to second end 99. For this twisted wedge lightguide, first end 101 is substantially non-parallel with second end 99. In one embodiment, first end 101 is substantially perpendicular with second end 99, or at least sufficiently close to being arranged within ninety degrees to one another to be viewed as perpendicular. Light from solid state light source 102 is input to lightguide 98 at first end 101 and output from lightguide 98 at second end 99 and possibly other surfaces. Solid state light source 102 is located proximate first end 101 or can be contained within a depression in first end 101. One solid state light source 102 is shown for illustrative purposes only; more light sources can be used. Base 100 would also contain electrical connections for delivering power to solid state light source 102.

Figure 16:
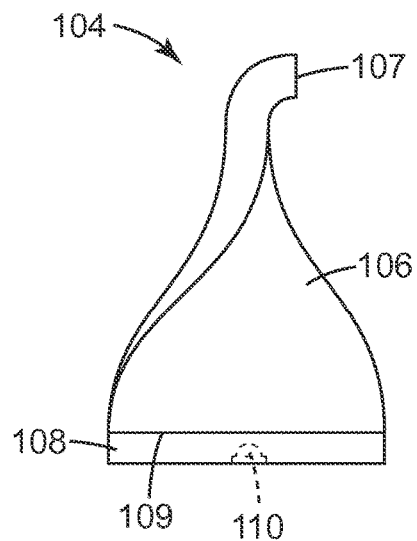
FIG. 16 is a first side view of a luminaire having a twisted wedge lightguide with a cantilevered end.
Figure 17:
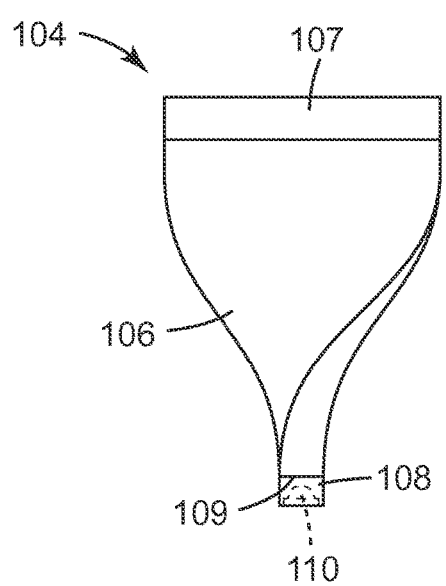
FIG. 17 is a second side view of the luminaire of FIG. 16.
Figure 18:
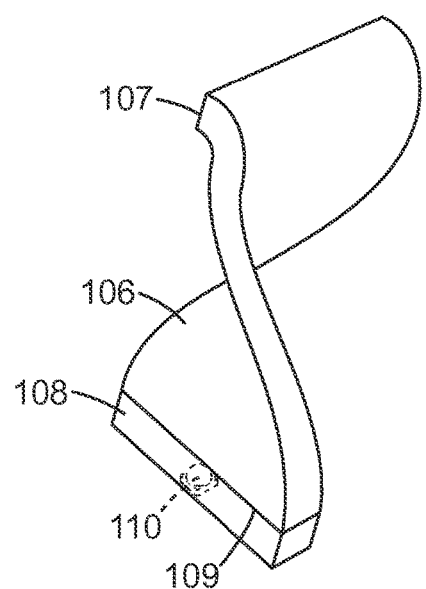
FIG. 18 is a perspective view of the luminaire of FIG. 16.

FIGS. 16-18 are first side, second side, and perspective views, respectively, of a luminaire 104 having a twisted wedge lightguide with a cantilevered end. Luminaire 104 includes a twisted wedge shaped lightguide 106 and an associated base 108. A solid state light source 110, such as an LED, is contained within base 108. Lightguide 106 includes a first end 109 and a second end 107 opposite first end 109. Lightguide 106 includes a cross section that varies in area between first and second ends 109 and 107, and the cross section preferably decreases in area from first end 109 to second end 107. For this twisted wedge lightguide, first end 109 is substantially non-parallel with second end 107. In one embodiment, first end 109 is substantially perpendicular with second end 107, or at least sufficiently close to being arranged within ninety degrees to one another to be viewed as perpendicular. Also for this twisted wedge lightguide, second end 107 is cantilevered with respect to first end 109. Light from solid state light source 110 is input to lightguide 106 at first end 109 and output from lightguide 106 at second end 107 and possibly other surfaces. Solid state light source 110 is located proximate first end 109 or can be contained within a depression in first end 109. One solid state light source 110 is shown for illustrative purposes only; more light sources can be used. Base 108 would also contain electrical connections for delivering power to solid state light source 110.

For luminaires 82, 96, and 104, the rail and base can be implemented with metal, for example, such as aluminum. The lightguides 84, 98, and 106 can optionally have optical films on their light input and output surfaces, or structures on their input surfaces, as described with reference to FIGS. 6A-6C. Lightguides 84, 98, and 106 in the luminaires of FIGS. 9-18 can have cross sections, between and as viewed from the first and second ends, with linear sides as shown. The cross sections can also have curved sides, or a combination of curved and linear sides. The exemplary lightguides 84, 98, and 106 shown in FIGS. 9-18 also have cross sections, between and as viewed from the first and second ends, that include a first side and a second side opposite the first side where the first and second sides do not meet. In comparison, the lightguide in FIG. 1 has a circular cross section that essentially folds back on itself without opposing sides that do not meet.

The lightguides for the luminaires can be implemented with, for example, a transparent or translucent material capable of receiving light from the one or more solid state light sources and emitting the light. For example, the lightguides can be made of an optically suitable material such as acrylic, polycarbonate, polyacrylates such as polymethyl methacrylate, polystyrene, glass, or any number of different plastic materials having relatively high refractive indexes. The material can be cast or molded, for example, to form the lightguides. The surfaces of the lightguides can optionally be polished. Furthermore, the optical guide can include a matrix material that can contain light frequency shifting chromaphores to obtain a more desirable color rendering index, and examples of matrix stabilized dyes are described in U.S. Pat. No. 5,387,458, which is incorporated herein by reference as if fully set forth. The lightguide can optionally include bulk scatter elements, such as particles within the lightguide, to provide for a soft glow appearance when the lightguide is illuminated by the solid state light sources.

The luminaires can include various optional features. A diffuser can be included over the distal end of the lightguide. The lightguide can also include various coatings for color effects or other purposes. Microstructures or nanostructures, possibly distributed within a pattern, can be included on a surface of the lightguide to extract light in conjunction with the extraction caused by the lightguide shape. The microstructures or nanostructures can include scattering or refracting features. Also, the light from the light sources can be at least partially pre-collimated in order to control extraction of the light in one direction along with lightguide shape to control extraction in another direction. If multiple different colored light sources such as LEDs are used, each color can be pre-collimated to a certain degree, and the light input end of the lightguide can include multiple injection regions for the various colors in order to facilitate a desired light output color and pattern.

The lightguide can optionally include a functional coating applied to one or more of its surfaces. Examples of functional coatings include the following. Coatings with optical functions include coatings to provide for anti-reflection, radiation shielding, photoluminescence, and IR emission for passive temperature control. Coatings with physical and mechanical functions include coatings to provide for anti-abrasion, scratch resistance, and hardcoats, examples of which are the hardcoat products for scratch resistance from Momentive Performance Materials Inc., Albany, N.Y. Coatings with chemical and thermodynamic functions include coatings to provide for dirt repellence, anti-fingerprint, and anti-corrosion. Coatings with biological functions include coatings to provide for anti-microbial properties. Coatings with electromagnetic solid state functions include coatings to provide for anti-static and electromagnetic shielding.

The invention claimed is:

1. A luminaire, comprising:
at least one solid state light source; and
a lightguide configured to receive light from the at least one solid state light source, wherein the lightguide has a first end and a second end opposite the first end,
wherein the light from the at least one solid state light source is coupled into the lightguide at the first end and transported within the lightguide by total internal reflection until the light exits the lightguide,
wherein a shape of the lightguide causes extraction of the light from the lightguide and the shape directs the extracted light from the lightguide,
wherein the lightguide comprises a twisted wedge where the first end is substantially non-parallel with the second end, the lightguide has a cross section varying in area between the first and second ends, the cross section has a first side and a second side opposite the first side, and the cross section has a rectangular shape extending from the first end to the second end,
wherein the shape causes the light to be extracted at the second end and not extracted along the first and second sides.

2. The luminaire of claim 1, wherein the first end is substantially perpendicular with the second end.

3. The luminaire of claim 1, wherein the second end is cantilevered with respect to the first end.

4. The luminaire of claim 1, wherein the cross section of the lightguide decreases in area from the first end to the second end.

* * * * *